Nov. 27, 1962  J. DE VRIES  3,065,773
WIRE TWISTING APPARATUS
Filed July 7, 1960
2 Sheets-Sheet 1

INVENTOR:
JOSEPH DE VRIES
BY
ATT'Y

Nov. 27, 1962

J. DE VRIES 3,065,773

WIRE TWISTING APPARATUS

Filed July 7, 1960

INVENTOR:
JOSEPH DE VRIES
BY

ATT'Y

United States Patent Office 3,065,773
Patented Nov. 27, 1962

3,065,773
WIRE TWISTING APPARATUS
Joseph De Vries, Chicago, Ill., assignor to Tendor Corporation, Franklin Park, Ill., a corporation of Illinois
Filed July 7, 1960, Ser. No. 41,331
6 Claims. (Cl. 140—119)

This invention relates generally to an apparatus for twisting wire and more particularly to an improved wire twisting apparatus for the joining of two or more wires together into a smooth, uniformly twisted connection of a predetermined regular shape.

In today's modern trend for mass production throughout industry, there is an ever increasing need for automatic apparatus to assist in the reduction of manufacturing cost and time. One of the more time consuming and costly operations which industry must cope with is the joining of a plurality of strands of wire into a compact uniform joint for electrical hook-up connections in electrical products. This seemingly simple task is very time consuming. Conventionally, twisting two or more wires together into a smooth, uniform shape so that they may be adaptable before or after solder dipping, for insertion through an opening or for attachment to an eyelet takes a great deal of time.

Heretofore, it has been necessary to join the wires by twisting them together manually by finger or pliers, and, although several hand operated devices have been designed to assist in the joining of the wires, the increment of time for the twisting operation is still excessive and the operation is very tiring. Not only is there a great loss of time in the standard methods of hand twisting wire strands, but the finished joint does not provide a smooth, even twist of all the wire strands nor are the extreme end portions of the wire strands a part of the twisted joint. Additional steps must be taken to shear off these loose ends if the wire is to be solder dipped. Also, the additional step of shearing off the loose ends will sometimes provide a bend or spread in the end portion of the twisted joint which makes it difficult to insert it into an eyelet or opening thus requiring an additional straightening of the twisted joint.

Uniformity in a twisted joint depends upon the skill of the operator in applying or controlling the amount of tension and the speed of twisting. Only very skilled labor can regularly provide a smooth, uniform twist over the entire length of the twisted joint. The uniformity of the twisted joint is very important, not for its appearance, but to provide ease of assembly to the product, uniform strength along the entire length of the twisted joint, a smooth surface to facilitate soldering if necessary, and to assure elimination of any burrs that might cause short circuits or cut the fingers of a fellow employee during another subsequent operation on an assembly line.

It is therefore the primary object of this invention to eliminate the problems present with the prior art and to provide an improved wire twisting apparatus for joining two or more strands of wire into a uniformly twisted joint with rapidity and sureness.

A specific object of this invention is to provide an improved wire twisting apparatus whereby an operator can join two or more wires into a smooth uniformly twisted joint in one operation.

Another object of this invention is to provide an improved wire twisting apparatus with which the tightness of the twisted strands may be varied to suit the application.

A further object of this invention is to provide an improved wire twisting apparatus wherein the work effort of the twisting action and force is provided by a prime mover.

A still further object of this invention is to provide an improved wire twisting apparatus whereby an unskilled operator can join two or more strands of wire into a smooth, uniformly twisted joint repeatedly within a fraction of the time required of a skilled operator to do the same conventionally.

Another object of this invention is to provide an improved wire twisting apparatus whereby the finished twisted joint has a uniformly tapered end portion to facilitate the insertion thereof into openings of eyelets, wire clips, etc.

A still further object of this invention is to provide an improved wire twisting apparatus that is compact in size, adaptable to be mounted on any standard assembly line bench and requires no additional devices to produce the desired twist joint.

Another object of this invention is to provide an improved wire twisting apparatus for the joining of two or more strands of wire that is inexpensive in cost and can be readily assembled from existing or readily made parts.

Another object of this invention is to provide a method of joining a plurality of wires into a smooth, uniformly twisted connection of a predetermined shape with increased uniformity in a fraction of the time required by the conventional method of producing the same connection.

With these objects and other features and advantages of the invention in mind, which will appear from the following description and claims taken in connection with the drawings, the invention consists in the novel construction arrangement, and formation of the parts wherein:

The wire twisting apparatus of this invention is characterized by the simplicity and the novel arrangement of the integral parts in which a constant speed electric motor is mounted on the base plate along with a twisting mechanism driven by the rotating shaft of the electric motor. The twisting mechanism is so arranged that an operator merely inserts the wires to be joined into automatically opening jaws in the end of a portion of the twisting mechanism and applies a slight pressure to an extending actuating arm to develop a positive clamping force between the jaws that tightly twists the wire strands. As the operator applies the force with his hand to the actuating arm he withdraws the plurality of wires progressively from between the jaws. The combined action of the jaws, and the rate of removal of the wires not only provides a uniformly twisted and burnished joint easily dip soldered, but also induces a uniform taper which facilitates the insertion of the joint into an eyelet or opening.

Figure 1:
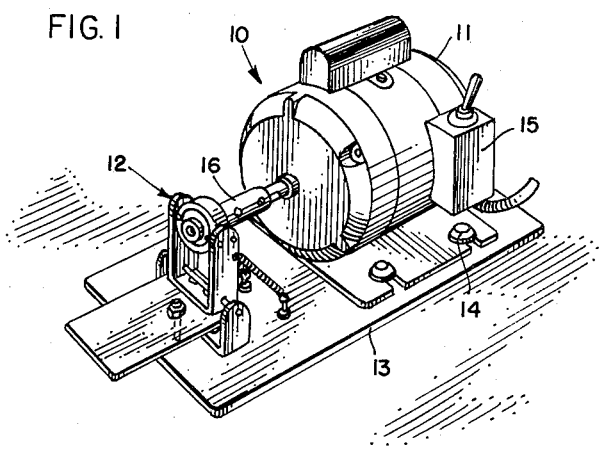
FIG. 1 is a perspective view of the wire twisting apparatus of this invention.

Turning to the specific illustration as shown in the drawings, FIG. 1 is an illustration of the assembled wire twisting apparatus embodying the invention. The apparatus, indicated by the number 10, comprises two main component parts, a motor section 11 and an actuating section 12. As viewed in FIGS. 1 and 2, both of the sections are detachably secured to a base 13 with the motor 11 and the actuating section 12 held in place on the base 13 by bolts 14 and screws 15, respectively. The motor is controlled by a simple on-off toggle switch and may be any suitable type, preferably a 1750 r.p.m. induction motor, depending somewhat upon the size of the wire to be twisted. The motor with the switching arrangement otherwise comprises a conventional prime mover and control.

Figure 2:
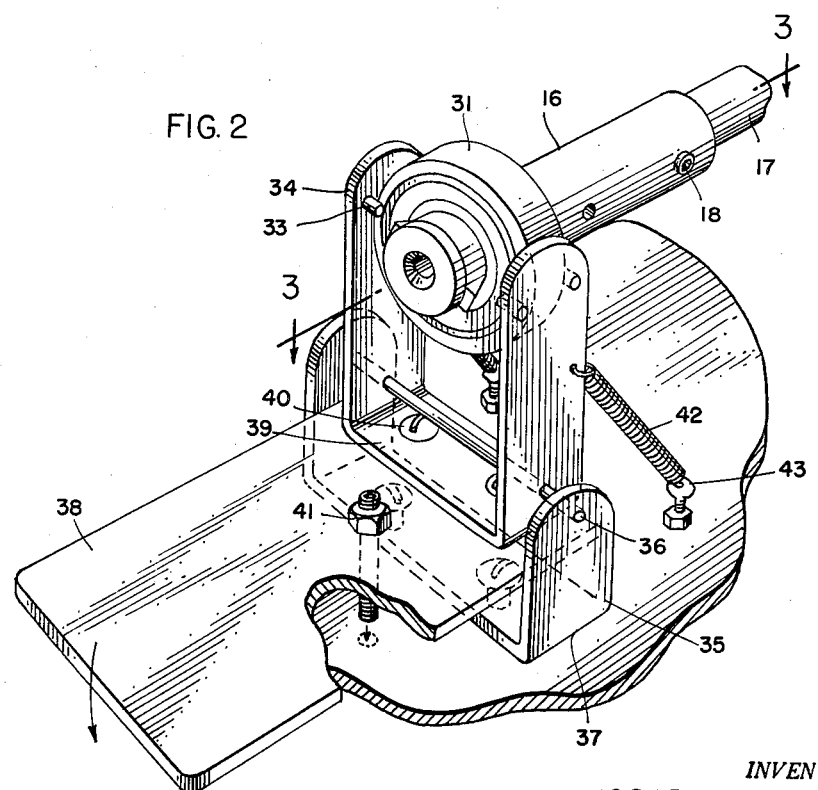
FIG. 2 is a fragmentary, cut-away, perspective view of the actuating mechanism of this invention.

As also shown in FIGS. 1 and 2, the actuating mechanism 12 includes a sleeve member 16 secured to a rotary shaft 17 of the motor by a set screw 18. As viewed in FIGS. 3 and 4, the sleeve 16 has a centrally recessed opening 19 at one end receiving the end of the rotary shaft 17 in a supported and driven relationship as secured thereto by a set screw 18.

Figure 3:
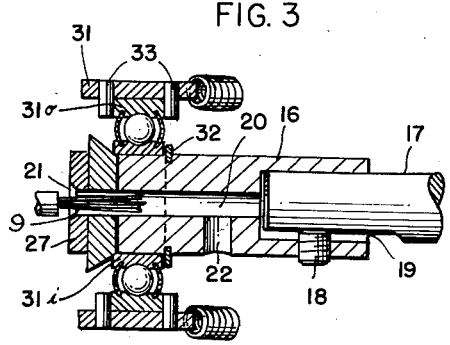
FIG. 3 is a fragmentary partially sectioned view taken along the line 3—3 of FIG. 2 illustrating the wire twisting weights in an outward position.
Figure 4:
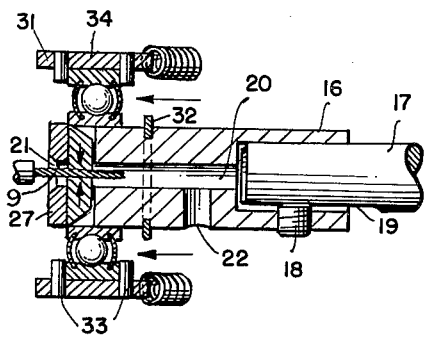
FIG. 4 is a fragmentary partially sectioned view similar to FIG. 3 illustrating the wire twisting weights in an inward or operating position.

Referring further to FIGS. 3 and 4, the opening may extend through the entire length of the sleeve 16 but is of reduced diameter at 20 to serve as a guide for a plurality of wires 9 received therein for the twisting operation. The diameter of the opening 20 will be determined by the size and number of wires to be joined at one time, it being desirable that the diameter be substantially greater than the gross untwisted dimension of the largest bundle of loose wires to be twisted at one time. A relief port 22 is provided at a right angle to the opening 20 as a means for expelling or removing any metallic dust, shavings, etc. that may collect during the twisting operations.

Figure 5:
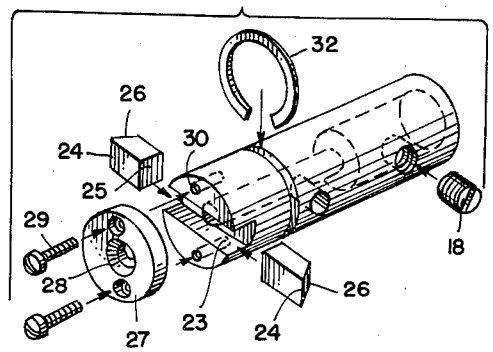
FIG. 5 is a perspective view in assembly relationship illustrating the twisting mechanism of this invention.

As viewed in FIG. 5, a slot 23 is machined diametrically across the end of the sleeve 16 to receive in sliding engagement two diametrically opposed jaws 24. The jaws 24 have burnishing facing surfaces 25 ground to a smooth, flat finish to engage and contact the wire strands while their remote ends are beveled to provide tapered, camming surfaces 26. A cap member 27, having a central opening 28 in alignment with the opening 20 of the sleeve 16, is secured to the end surface of sleeve 16 by a pair of screw members 29 threadably engaging in openings 30 in the end of the sleeve 16. The cap member 27 not only provides a beveled opening 21 for funneling the wire strands into the twisting mechanism but also provides a wall retaining the jaws 24 against displacement as the twisted strands are retracted.

In FIGS. 1 and 2, a bearing assembly, preferably a frictionless bearing 31, is shown with the inner race 31i slidably mounted on the sleeve 16 for a longitudinal forward movement that forces the jaws 24 inwardly as adjustably limited by a stop 41 to a jaw releasing position limited by a split ring 32. For this purpose the bearing 31 is longitudinally driven on the sleeve 16 by a pair of retaining pins 33 which engage the end surfaces of the outer bearing race 31o. The pin members 33 are in turn secured to the upwardly extending arms of a yoke 34 which is in turn pivotally mounted at its bottom to a bracket 35 by means of a pin 36. As readily viewed in FIG. 2, the yoke 34, is substantially U-shaped, and telescopes inside the upright arms of the base bracket 35. A pivot pin 36 extends through the over-lapping arms of the base bracket and yoke at a point 37. Still referring to FIG. 2, the yoke 34 has an actuating arm 38 secured to its bottom portion 39 by a pair of screws 40 and extends outwardly parallel to the base plate 13 at right angles to the arms of the yoke 34. The stop 41 constitutes a maximum travel stop adjustment and is mounted near the end of the actuating arm that joins the yoke 34. As seen in FIGS. 1 and 2, the stop adjustment is a threaded element which can be manually altered to control the amount of downward movement of the actuating arm 38. The lowermost end of the stop adjustment bottoms on the upper surface of the base plate 13 and serves in conjunction therewith as a stop means, it being understood that any suitable limiting means may be utilized for this control of the arm movement. Tension springs 42 are secured between the arms of yoke 34 and the base plate 13 as suitably tensioned by adjustable eyelets 43 to retract the yoke and normally bring the bearing 31 against the split ring 32.

Figure 6:
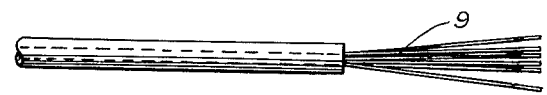
FIG. 6 is a view of a standard piece of wire having the end stripped therefrom showing the plurality of strands before twisting.

In operation, the motor 11 is energized by snapping on the toggle switch. The sleeve 16, being secured to the shaft 17 of the motor, will immediately come up to a constant r.p.m. whereby the jaw members 24 (FIG. 3) will move in an outwardly radial direction due to centrifugal force. Their travel is controlled in the outward direction by the engagement of the inner race of the bearing 31 with the tapered camming surfaces 26. It is understood that the total relative travel of the jaws 24 will be slightly less than the radial length of the beveled camming surface 26. When the jaws 24 are in their extreme outer position they provide an opening within the sleeve 16 corresponding to the opening 20. The tension springs 42, acting through the yoke 34, holds the bearing 31 into a rearward or retracted position to insure the maximum outward travel of the jaws 40. With the jaws normally in this extreme position, the operator removes the insulation material from the wires, commonly referred to as "stripping," and inserts the wire strands 9 as shown in FIG. 6 or in FIG. 7, through the opening 28 into the opening 20 of the sleeve 16 and then presses downwardly on the actuating arm 38. This action will advance the bearing member 31 through the yoke 34 and cam the jaws 24 radially inward against the wire strands. As the jaws contact the wire strands the wires begin to bundle together and as clamping pressure is applied the bundle is tightly twisted and burnished over the contact area to a surface of revolution determined by the rotating jaws. Thereafter, the operator draws the wire strands from the opening at a smooth, steady rate and the entire length is tightly twisted, burnished and tapered. By setting the maximum travel adjustment 41, an operator can repeatedly twist the same number of wire strands into substantially identical twisted joints with each joint having the same uniformity of twist and taper. As the force of the jaws progressively twist the strands beginning at their base the individual strands turn as they twist and take a set that preserves the tight joint and the jaws under pressure burnish the exposed wire portions of the twisted joint to a surface of revolution 50 defined by the jaws as the resulting joint is gradually withdrawn with the result that the overall diameter of the twist can be progressively diminished towards its outer end and also the center strands of the joint extend as a short taper 51 beyond the outermost strands that have been helically foreshortened longitudinally by the twisting action.

Figure 7:
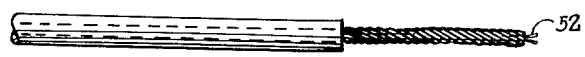
FIG. 7 is a view of the standard wire of FIG. 6 having the plurality of strands in twisted relationship as effected by the twisting apparatus of this invention.
Figure 8:
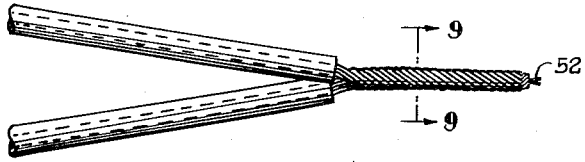
FIG. 8 is a view of two wire members similar to the wire of FIG. 7 in twisted relationship as effected by the twisting apparatus of this invention.
Figure 9:
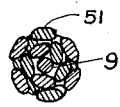
FIG. 9 is an enlarged section taken on line 9—9 of FIG. 8.

From the foregoing explanation it will be seen how one may take a single wire (FIG. 6) having a plurality of strands, and provide a smooth, even twisted end portion as illustrated in FIG. 7, or may join the strands of two or more wires by means of this apparatus illustrated. Regardless of the number of wires joined, the clamping force of the smooth jaws and the steady pulling of the wires from the apparatus, not only provides a smooth uniformly twisted joint but forms the slight uniform taper towards the end of the twisted joint which is desirable for solder dipping or eyelet insertion as when one tries to thread the twisted joint through a small opening.

To those skilled in the art it is readily apparent that the wire twisting apparatus of this invention provides an improved means for the joining of wire strands into a smooth, uniformly twisted joint which can be accomplished in a fraction of the time required to perform the same operation by hand. It is realized that the actual details of the construction may be modified by one skilled

What is claimed is:

1. A wire twisting machine for joining a plurality of wires in a uniformly twisted joint of a predetermined shape comprising a continuously rotated shaft, radially movable jaws rotatably driven by said shaft and urged by centrifugal force to separate and receive strands of wire therebetween, guide means for directing and confining the free ends of said wire strands to axial movement between said jaws, said jaws having opposing, burnishing surfaces for engaging said strands of wire on opposite sides thereof, actuating means for moving the jaws towards each other to carry said surfaces into engagement with said strands therebetween under pressure, said jaws progressively twisting a plurality of wire strands therebetween in tightly compacted helices to form a joint and simultaneously therewith burnishing the externally exposed surfaces of the wire strands of the joint in an axial direction towards and across the free ends of said strands as the joint is moved outwardly from between said jaws.

2. The invention as set forth in claim 1 wherein said actuating means includes pivotally mounted yoke member, an extending arm for actuating said yoke at a station in close proximity to said sleeve member, and a pair of pin members carried by said yoke member in contact with the outer surfaces of the bearing assembly.

3. The invention as set forth in claim 1 wherein said actuating means is provided with an adjustable limit stop whereby an identical force may be applied to the plurality of wires repeatedly to assure a uniformity of twist to each joint.

4. A wire twisting apparatus for joining a plurality of wires into a uniformly twisted connection of a predetermined shape comprising a motor, means to control the motor to run continuously, a sleeve member driven by the shaft of said motor for continuous positive rotation thereby, said sleeve having a central opening in the front end thereof for receipt of the bare ends of a plurality of wires axially therein, normally open jaw members disposed in the end of the sleeve for continuous rotation therewith and having burnishing faces, means carried by said sleeve for supporting the jaws for relative movement transverse to the sleeve towards and centrifugally away from each other within said central opening, means slidably secured on the sleeve for moving said jaws towards each other during rotation to engage said bare ends, means actuating said slidable means for controlling the spacing of said jaws during their movement towards each other, and a base plate securely mounting the motor and actuating means in cooperating relationship for controlling variably the spacing of said jaws to engage and apply a variable compressive pressure upon said bare ends between said burnishing faces of the jaws with a progressively axially sliding contact to uniformly twist and progressively burnish said bare ends externally as the twisted bare ends pass from between the jaws.

5. The invention as set forth in claim 4 including means for resiliently urging said jaw moving means to a resting position releasing said jaws for outward movement under centrifugal force.

6. A wire twisting apparatus for joining a plurality of wires into a uniformly twisted relationship comprising an electric motor, a sleeve member secured to the shaft of the motor for continuous rotation thereby, said sleeve having a central opening over a portion of its length for receipt of the plurality of wires to confine the wires therein in axially guided relationship, jaw members having burnishing faces disposed in the end of the sleeve for free movement at right angles thereof under centrifugal force, a bearing assembly slidably secured on the sleeve to engage and move said jaws towards each other to engage the confined wires, stop means on the sleeve to limit the longitudinal movement of the bearing to maintain engagement with said jaws and prevent their dislocation, actuating means for the bearing to drive said jaws towards each other under forces compressing said wires therebetween, and a base plate for securely mounting the motor and actuating means in spaced relationship engage the wires with a sliding progressively axial contact to effectively form and externally burnish a uniformly twisted joint of the plurality of wires with said burnishing faces.

References Cited in the file of this patent

UNITED STATES PATENTS

| | | |
|---|---|---|
| 1,372,531 | Mitchell | Mar. 22, 1921 |
| 1,891,664 | Brenizer | Dec. 20, 1932 |
| 2,214,267 | Bednarek | Sept. 10, 1940 |
| 2,289,253 | Dowd | July 7, 1942 |
| 2,297,174 | Tabb et al. | Sept. 29, 1942 |